United States Patent
Yamaguchi et al.

(10) Patent No.: US 8,452,487 B2
(45) Date of Patent: May 28, 2013

(54) APPARATUS FOR INFORMING DESTINATION APPARATUS OF MALFUNCTIONS OCCURRING IN COMMUNICATION WITH SOURCE APPARATUS AND SYSTEM INCORPORATING THE SAME THEREIN

(75) Inventors: Taichi Yamaguchi, Obu (JP); Katsutoshi Haruna, Anjo (JP)

(73) Assignee: Denso Corporation, Kariya (JP)

( * ) Notice: Subject to any disclaimer, the term of this patent is extended or adjusted under 35 U.S.C. 154(b) by 398 days.

(21) Appl. No.: 12/928,881

(22) Filed: Dec. 21, 2010

(65) Prior Publication Data
US 2011/0160954 A1 Jun. 30, 2011

(30) Foreign Application Priority Data
Dec. 24, 2009 (JP) ................ 2009-292777

(51) Int. Cl.
*G01M 17/00* (2006.01)
*G06F 7/00* (2006.01)
*G06F 19/00* (2006.01)

(52) U.S. Cl.
USPC ........................... 701/33.4; 701/36

(58) Field of Classification Search
USPC .................... 701/33.4, 36
See application file for complete search history.

(56) References Cited

U.S. PATENT DOCUMENTS

| | | | |
|---|---|---|---|
| 2003/0011654 A1 | 1/2003 | Asauchi | |
| 2004/0207540 A1 * | 10/2004 | Tanaka | 340/870.07 |
| 2007/0088473 A1 * | 4/2007 | Moon et al. | 701/36 |
| 2007/0158058 A1 * | 7/2007 | Arshad et al. | 165/202 |
| 2008/0288137 A1 * | 11/2008 | Hatta | 701/36 |
| 2009/0138137 A1 * | 5/2009 | Iwagami et al. | 701/1 |
| 2010/0146134 A1 * | 6/2010 | Kobayashi et al. | 709/229 |

FOREIGN PATENT DOCUMENTS

| | | |
|---|---|---|
| JP | 2001-055026 | 2/2001 |
| JP | 2002-370378 | 12/2002 |
| JP | 2005-343183 | 12/2005 |
| JP | 2007-112314 | 5/2007 |
| JP | 2007-331537 | 12/2007 |
| JP | 2009-208504 | 9/2009 |
| JP | 2010-089621 | 4/2010 |

* cited by examiner

*Primary Examiner* — Thomas Tarcza
*Assistant Examiner* — Imran Mustafa
(74) *Attorney, Agent, or Firm* — Harness, Dickey & Pierce, PLC (57) ABSTRACT

In a system reporting a malfunction in connection of a first communication line and a desired source apparatus which is due to be connected to the first communication line. In a first memory section, information showing that the source apparatus is due to be present in the system is stored in advance and a malfunction informing apparatus connected to a second communication line. Whether or not the communication is interrupted is checked based on connection information in a second memory section and the information stored in the first memory section. The connection information shows connection history showing that the source apparatus was connected to the first communication line. Through the second communication line, it is informed to a destination apparatus that there is a malfunction in the connection of the source apparatus and the first communication line, when it is checked that the communication is interrupted.

10 Claims, 6 Drawing Sheets

APPARATUS FOR INFORMING DESTINATION APPARATUS OF MALFUNCTIONS OCCURRING IN COMMUNICATION WITH SOURCE APPARATUS AND SYSTEM INCORPORATING THE SAME THEREIN

CROSS-REFERENCE TO RELATED APPLICATION

This application is based on and claims the benefit of priority from earlier Japanese Patent Application No. 2009-292777 filed Dec. 24, 2009, the description of which is incorporated herein by reference.

BACKGROUND

1. Technical Field

The present invention relates to communication between a source apparatus and a destination apparatus, and in particular, to informing the destination apparatus of malfunctions (such as communication interruptions (or blackouts)) occurring in communication with the source apparatus.

2. Related Art

A conventional apparatus of this type is shown in Japanese Patent Application Publication (Laid-open) No. 2005-343183, in which two ECUs (electronic control units) are CAN-communicably connected to each other. One of the two ECUs is an EPS (electronic power steering)-ECU for controlling an electronic motor mounted in an on-vehicle steering gear box and the other is a steering-assist ECU which gives, as regular intervals, the EPS-ECU a control command showing a target steering torque under CAN communication protocol. Hence, in the publication, an amount of change in the in target steering torque is calculated and used to detect a malfunction in controlling lane keeping assist control. This control adopts a preset upper limit for limiting an amount of change between the current target torque and the last target torque. In addition, this publication teaches an increase in the preset upper limit when there occurs an interruption of communication between the steering assist ECU and EPS-ECU. This increase in the upper limit prevents the control command from being lost many times during the interruption.

In the system shown by the publication, in the similar way to other known systems, the EPS-ECU serves as a malfunction informing apparatus, which is able to store, in its non-volatile memory, information showing "history of connection" with the source apparatus (steering assist ECU), once the EPS-ECU receives from steering assist ECU data showing the target steering torque. Since the data showing the connection history is stored in the nonvolatile memory, the malfunction informing apparatus is able to determine whether or not a duration during which the data have not been received from the source apparatus is over a preset period of time. That is, the communication interruption determination can be performed with the source apparatus. If it is determined that the duration is over the preset period of time, the EPS-ECU informs the fact that the communication with the source apparatus is interrupted. In contrast, if there is no connection history with the source apparatus in the memory, the malfunction informing apparatus estimates that this apparatus has not been connected the communication line, and it is not required to perform the communication interruption determination. Hence, in this case, this determination itself will not be performed.

However, when the determination itself will not be performed as above, the following drawbacks will be caused.

Figure 10A:
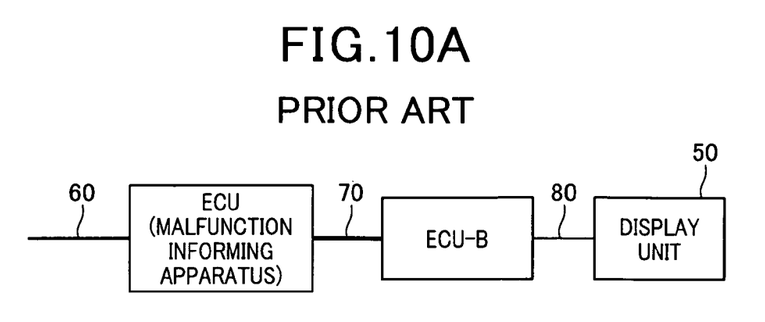
FIGS. 10A and 10B are illustrations respectively explaining drawbacks of conventional systems.
Figure 10B:
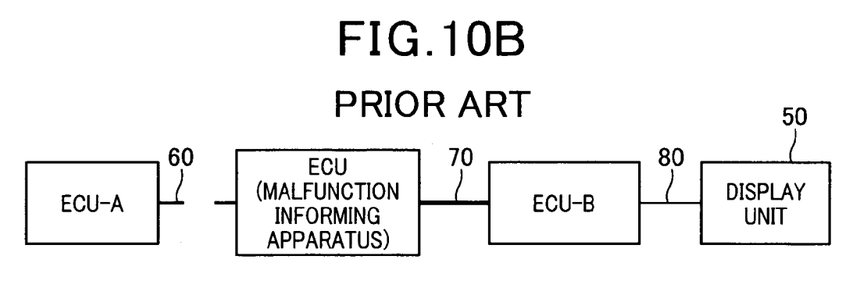

FIGS. 10A and 10B respectively show a communication system functionally including a malfunction reporting system. In the system shown in FIG. 10A, there is provided no ECU-A as shown in FIG. 10B. The ECU-A shown in FIG. 10A, which functions as a source apparatus, is a tire air-pressure monitoring apparatus in a vehicle, for example. In both FIGS. 10A and 10B, an ECU-B, which functions as a destination apparatus, is a meter ECU and connected to a display unit 50 through a direct line 80 to control the display unit 50. Through a communication line 70, this ECU-B is connected to another ECU which is designated as a malfunction informing apparatus, which is thus called "designated ECU". A connection line 60 is connected to the designated ECU.

In the condition 1 in FIG. 10A where there is no ECU-A (source apparatus), there will be no communication between the designated ECU (malfunction informing apparatus) and the ECU-A, as a matter of course. In this case, information indicating "history of connection" with the ECU-A will not be written into the nonvolatile memory of the designated ECU, with the result that the memory maintains information indicating "no history of connection".

As described, the designated ECU determines the communication interruption only in cases where information showing "history of connection" is written in its nonvolatile memory. Hence, in the condition 1 shown in FIG. 1, the designated ECU cannot detect that the ECU-A is unconnected to the communication line 60, and thus cannot inform the ECU-B of this unconnected state of the ECU-A with the communication line 60. This also prevents the ECU-B from informing users (for example, service persons of the vehicle) of this unconnected state through the display unit 50.

The condition 2 shown in FIG. 10B shows that at least one of the ECU-A and the communication line 60 is out of order and the communication therebetween cannot be performed. If this communication-disabled condition is caused at the beginning of incorporation of the ECU-A into a malfunction reporting system, the communication cannot be performed normally from the beginning between the ECU-A and the designated ECU. This results in that no information showing "history of connection" is written into the nonvolatile memory of the designated ECU, with no history of connection (history connection) kept therein.

In this condition 2, the designated ECU cannot detect a malfunction of either one or both of the ECU-A and the communication line 60 and an unconnected state of the ECU-A with the designated ECU due to the malfunction. The reason is that, as described before, the designated ECU can determine the communication interruption only when information showing "history of connection" is stored in its non-volatile memory. As a result of this condition 2, the ECU-B cannot use the display unit 50 to report vehicle service persons of this malfunction.

In this way, the condition 1 exemplifies a malfunction of connection with the ECU-A, which is due to lack of the ECU-A which, under normal circumstances, should be incorporated in the malfunction reporting system. In contrast, the condition 2 exemplifies a malfunction of connection with the ECU-A due to a interruption caused at the ECU-A and/or the communication line 60, although the ECU-A exists in the malfunction reporting system. In any of the conditions 1 and 2, the designated ECU fails to detect and inform users of a malfunctioning state, contrary to the fact that a malfunction has occurred in the connection. This is cause there is stored no information showing "history of connection" in the nonvolatile memory of the designated ECU.

In addition, the conventional malfunction reporting system has another drawback. After information showing "history of connection" with the ECU-A is written into the nonvolatile memory of the designated ECU, the designated ECU may be replaced with new one due some reasons such as a malfunction occurring at the designated ECU itself. The new designated ECU has no information showing "history of connection" in its nonvolatile memory. In such a situation, the ECU-A and/or the communication line 60 may be out of order before the replacement. This results in the same condition as the foregoing condition 2. Hence, in this case, though there is actually a malfunction in the connection, it is impossible to inform the connection malfunction.

SUMMARY

Therefore, an object is to improve the foregoing drawbacks in which a malfunction in the connection of the source apparatus with the communication line cannot be informed to, for example, users, even though the connection is out of order.

As one aspect of the present disclosure, there is provided a system reporting a malfunction in connection of a first communication line and a desired source apparatus which is due to be connected to the first communication line. The malfunction reporting system comprises a first memory section in which information showing that the source apparatus is due to be present in the system is stored in advance and a malfunction informing apparatus connected to a second communication line. The malfunction informing apparatus comprises a second memory section, a write section that writes, in the second memory section, connection information showing connection history showing that the source apparatus was connected to the first communication line, based on reception of data from the source apparatus via the first communication line, a checking section that checks, for the source apparatus about which the connection history is stored in the second memory section, whether or not the communication is interrupted based on the connection information in the second memory section and the information stored in the first memory section, and a malfunction informing section that informs, through a second communication line, that there is a malfunction in the connection of the source apparatus and the first communication line, when it is checked by the communication interruption checking section that the communication is interrupted. The malfunction reporting system further comprise a reporting apparatus that is connected to the malfunction informing apparatus through the second communication line and that reports the malfunction in response to information sent from the malfunction informing section through the second communication line, the information showing that there is the malfunction in the connection.

DETAILED DESCRIPTION OF PREFERRED EMBODIMENTS

Referring to FIGS. 1-7, a malfunction informing apparatus and a malfunction reporting system according to an embodiment of the present invention will now be described. The malfunction informing apparatus herein is directed to a gateway ECU (herein referred to as GW-ECU) 20, while the malfunction reporting system herein is practiced as a system which includes the GW-ECU 20, a monitoring ECU 11 (source apparatus) belonging to a tire pressure monitoring system 10, a meter ECU 31 (destination apparatus) belonging to a meter apparatus 30 mounted in a vehicle C, and communication lines 60 and 70. The apparatus and system according to the present invention are based on standard specifications as directed by specific districts or countries where the tire pressure monitoring system is enforced to be mounted in vehicles by law.

Figure 1:
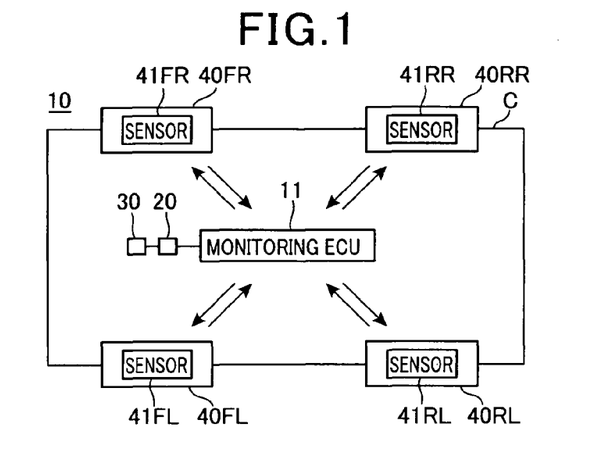
FIG. 1 is a block diagram outlining the configuration according to an embodiment of the present invention, wherein the embodiment shows a vehicle provided with a malfunction reporting system including a malfunction informing apparatus.

FIG. 1 shows a tire pressure monitoring system 10 mounted in a vehicle C, in which the system 10 comprises a monitoring ECU 11 and tire sensors 41FL, 41FR, 41RL, and 41RR for detecting the air pressure of tires, respectively.

The tires sensors 41FL, 41FR, 41RL, and 41RR are incorporated in tube-less tires of air-pressure injection type (simply, referred to as tires), which respectively provide a left front wheel 40FL, a right front wheel 40FR, a left rear wheel 40RL, and a right rear wheel 40RR. The tire sensors 41FL, 41FR, 41RL, and 41RR are generalized as a tire sensor 41, if necessary.

Each of the tire sensors 41FL, 41FR, 41RL, and 41RR) is configured to detect air pressure and temperature in each tire and at intervals, and transmit data indicative of detected results via antennas (not shown). The antennas transmit the data though electromagnetic waves of a megahertz frequency range. The tire sensors 41FL, 41FR, 41RL, and 41RR are given different identification patterns in advance such that each tire sensor 41FL (41FR, 41RL, and 41RR) outputs and transmits the detected results with the identification pattern attached thereto.

In the present embodiment, instead of the sensors to detect the air pressure and temperature in the tires, sensors for detecting only the air pressure of the tires may be adopted.

The monitoring ECU 11 includes a known computer provided with a CPU and embedded memories and an antenna (not shown) capable of receiving electromagnetic waves in the foregoing frequency range. This ECU 11 is communicably connected to a communitarian line 60 arranged in a vehicle C. The CPU of the monitoring ECU 11 executes programs stored in the embedded memories to provide the following operations.

The monitoring ECU 11 receives, through the antenna, at intervals, data indicating the air pressure and temperature in each tire, from the tire sensor 41. Using the received data, this ECU 11 determines which tire has transmitted the data, whether or not the air pressure in the tire is less than a preset air pressure, and the temperature in the tire is less than a preset temperature.

When the monitoring ECU 11 determines that the air pressure in the tire is less than the preset value or the temperature in the tire is less than the preset value, this ECU 11 estimates that there is a malfunction in the tire which is now in diagnosis. In this case, the ECU 11 transmits information indicative of the tire which is currently being diagnosed and the malfunction thereof to the meter apparatus 30 (i.e., meter ECU 31) via the communication line 60, GW-ECU 20, and communication line 70. In response to being physically connected to the communication line 60 arranged in the vehicle C, the monitoring ECU 11 automatically begin to transmit, at intervals, the above information, even if there is caused no malfunction of the air pressure and/or temperature.

In the present embodiment, the monitoring ECU 11 serves as a source apparatus and information showing that a malfunction has occurred in a tire, identifying the tire in which the malfunction has been caused, and the ECU 11 has connected to the communication line 60 can be simply referred as "data." Furthermore, the communication line 60 can be described as a line communicably connecting the source apparatus and the malfunction informing apparatus.

Figure 2:
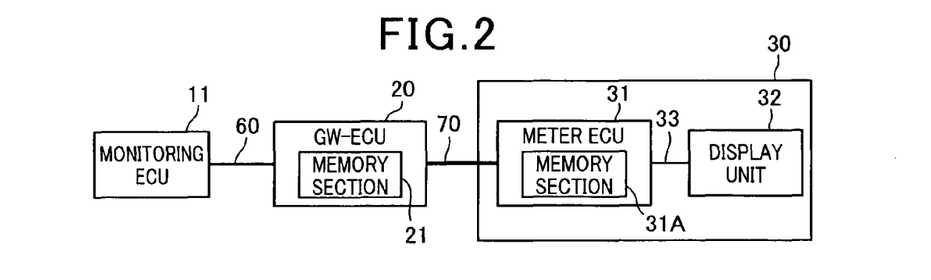
FIG. 2 is a block diagram showing the malfunction reporting system including the malfunction informing apparatus.

The meter apparatus 30 includes a meter ECU 31, a display unit 32, and a direct line 33. Similarly to the foregoing monitoring ECU 11, the meter ECU 31 is provided as a known type of computer with a CPU and memories, and connected to the display unit 32 via the direct line 33.

The embedded memory 31A of the meter ECU 31 is nonvolatile memories such as flash memories. In the embedded memory 31A, information about the source apparatus is stored, which is represented by "monitored ECU is present" in FIG. 2. The information about the source apparatus means information indicative of the connection of the monitoring ECU 11 with the GE-ECU 20 via the communication line 60, that is, information showing that the monitoring ECU 11 has been mounted in the vehicle C. The embedded memory 31A of the meter ECU 31 serves as a source memory in the present embodiment.

The display unit 32 is provided as a liquid crystal display (LCD) unit, for example and arranged positionally appropriately in the interior of the vehicle C. The meter ECU 31 operates by executing programs previously stored in the embedded memory 31A thereof, and the operations of the ECU 31 are as follows.

The meter ECU 31 receives data showing that a malfunction has been caused in a tire and data identifying the malfunctioning tire from the monitoring ECU 11 via the communication line 60, GW-ECU 20, and communication line 70. In response to this reception, the ECU 31 informs a user of such facts about the occurring malfunction by displaying the received information on the display unit 32 in a visible form. In addition, when receiving from the GW-ECU via the communication line 70 a notice (malfunction notice) that there has occurred a malfunction in a connection between the monitoring ECU 11 and the GW-ECU 20, the meter ECU 31 also informs a user of this malfunction notice by displaying this on the display unit 32. Though the malfunction notice is detailed later, the malfunction notice includes two types of notices, one of which is a communication interruption notice indicating an interruption in the communication between the monitoring ECU 11 and the GE-ECU 20 and the other is a ECU-absence notice indicating that the monitoring ECU 11 is not present in the vehicle C.

In the present embodiment, other types of display units other than the LCD, such as 7-segment displays, can be adopted. Differently from the display unit, audio devices such as speakers and/or buzzers may be adopted to provide a user with the information showing that a malfunction has occurred in a tire, identifying the malfunctioning tire, and the malfunction notice. Any types of notice apparatuses may be adopted.

The GW-ECU 20 is also a known computer with a CPU and memories embedded therein which include a memory section 21, and the CPU executes programs previously stored in its embedded memories. The execution of the CPU allows the ECU 20 to act as a gateway ECU for communicably connect networks whose protocols are different from each other.

Practically the GW-ECU 20 is connected to the monitoring ECU 11 via the communication line 60 and operates based on a CAN protocol to transmit and receives the data to and from the ECU 11. The GW-ECU 20 is also connected to the meter ECU 31 via the communication line 70 and operates based on a LIN protocol to transmit and receives the data to and from the ECU 11. When receiving the data from the monitoring ECU 11 via the communication line 60 based on the CAN protocol, the GW-ECU 20 transmits the received data to the meter ECU 31 via the communication line 70 based on the LIN protocol.

Figure 3:
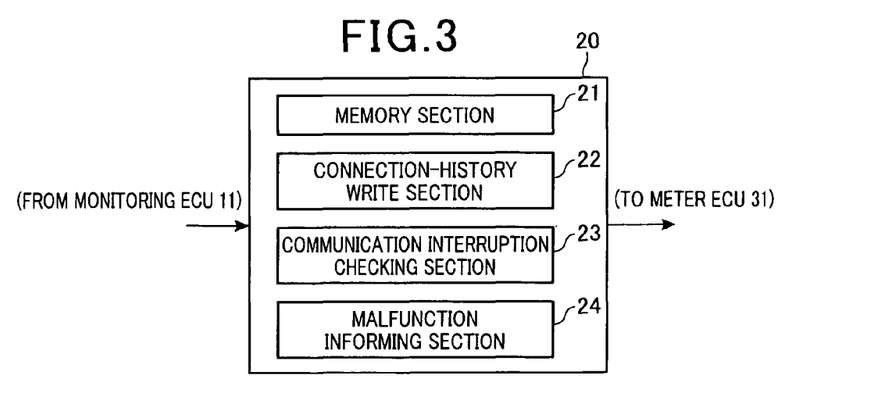
FIG. 3 is a block diagram functionally showing the malfunction informing apparatus.

In addition, the GW-ECU 20 is able to execute various other types of programs stores in its embedded memories for various other functions. Hence, such functions gives the GW-ECU 20 a connection-history write section 22, a communication interruption checking section 23, and a malfunction notice section 24.

A memory section 21 is a given to the GW-ECU 20 and is composed of nonvolatile memories such as flash memories. Information showing connection history is stored in this memory section 21. The connection history means that the monitoring ECU 11 was communicably connected to the communication line 60 before. The connection history is kept in the memory section 21 as long as a dedicated tool is not used to deliberately delete it in repair sites for example.

Figure 4:
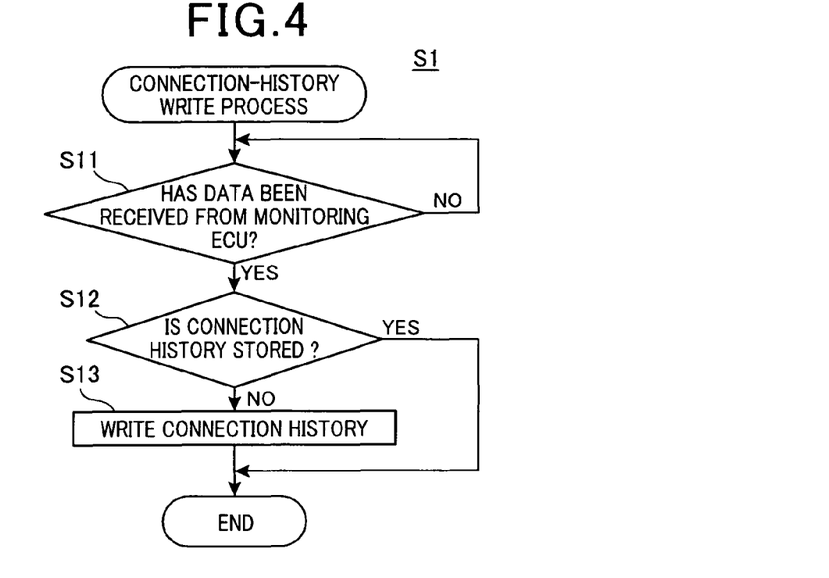
FIG. 4 is a flowchart exemplifying a connection-history write process executed by the malfunction informing apparatus.

The connection-history write section 22 is configured to execute a connection-history write process S1 shown in FIG. 4, which is as follows.

This section 22 executes a determination process at step S11, in which it is determined whether or not the GW-ECU 20 has received the data from the monitoring ECU 11 via the communication line 60. If this determination shows NO, i.e., the data has not been received, this determination at step S11 is repeated. During this repetition, if the determination shows YES, i.e., the data has been received, the processing proceeds to step S12 for the next determination process. In this way, until the data is received from the monitoring ECU 11 via the communication line 60, the connection-history write section 22, i.e., the GW-ECU 20, waits at step S11.

At step S22, the connection-history write section 22 determines whether or not information indicative of the connection history of the monitoring ECU 11 is stored in the memory section 21. When this determination is YES, that is, such information is already stored in the memory section 21, the write section 22 terminates the connection-history write process S1 without writing connection history of the monitoring ECU 11 into the memory section 21. Meanwhile if the determination at step S21 is NO, that is, the connection history is not stored yet in the memory section 21, the processing then proceeds to step S13, where information showing the connection history is written in the memory section 21.

In the present embodiment, only the monitoring ECU 11 is connected to the GW-ECU 20 via the communication line 60. Alternatively, other apparatuses as well as the monitoring ECU 11 may be connected to the GW-ECU 20 via the communication line 50. In such an alternative example, the GW-ECU 20 is configured to write, in its memory section, information showing the connection history, every apparatus connected thereto via the communication line 60.

Figure 5:
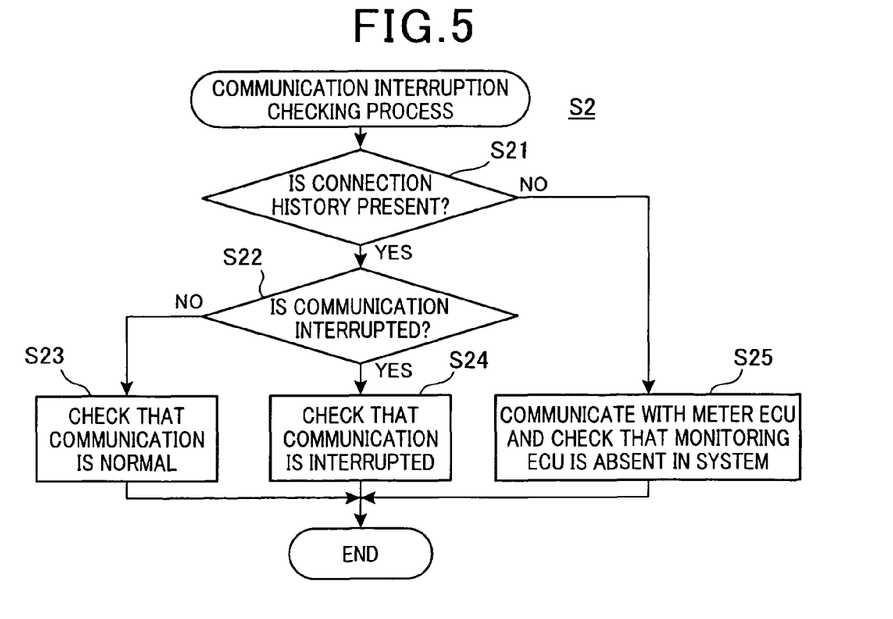
FIG. 5 is a flowchart exemplifying a communication interruption determination process executed by the malfunction informing apparatus.

The communication interruption checking section 23 repeatedly executes, at intervals of a fixed duration, a communication interruption determination process S2 shown in FIG. 5. This repetition of the process S2 makes it possible to determine whether or not the communication via the communication line 60 is interrupted based on how the data is received from the monitoring ECU 11 via the communication line 60.

Practically, when the checking section 23 activates the communication interruption determination process S2, the processing is first executed at step S21. At this step S21, it is checked whether or not information showing the history of connection of the monitoring ECU 11 is stored in the memory section 21.

If the check at step S21 shows YES, that is, the information showing the connection history is stored already, the communication interruption checking section 23 proceeds to step S22, where reception during a predetermined period of time (e.g., 10 seconds) is checked. In other words, it is checked whether or not data has been received during the predetermined period of time starting at the last reception of data from the monitoring ECU 11 via the communication line 60. By this check, it is possible to examine whether the communication between the monitoring ECU 11 and the GW-ECU 20 is interrupted (breakdown).

If the check at step S22 is NO, that is, the data has been received during the predetermined period of time, the checking section 23 proceeds to step S23 to conclude that the communication with the monitoring ECU 11 is "normal." In contrast, if the check at step S22 is YES, the data has not been received during the predetermined period of time, the checking section 23 proceeds to step S24 to conclude that the communication with the monitoring ECU 11 is interrupted, which is called "communication interruption."

Furthermore, if the checked result at step S21 is NO, that is, there is no information showing the connection history in the memory section 21, the communication interruption checking section 23 proceeds step S25 to conclude that there is no monitoring ECU, that is, "absence" of the monitoring ECU. In this case, the step S22 is not subjected to the processing. The reason why the checking section 23 is allowed to execute this checking is that source apparatus information is stored in the embedded memory 31A of the meter ECU 31 and the GW-ECU 20 is connected to the meter ECU 3 via the communication line 70. The source apparatus information includes pieces of information showing that a monitoring ECU should be connected to the GW-ECU 20 via the communication line 60.

In the present embodiment, as described, in only cases where it is checked that the information showing the connection history is stored in the memory section 21 (YES at step S21), the communication interruption checking section 23 shifts its processing to step S22 to check an interruption of the communication with the monitoring ECU 11. That is, the communication interruption is checked only for the source apparatus (in this embodiment, monitoring ECU 11) whose connection with the GW-ECU 20 is shown by information stored in the memory section 21. However, this is just an example. An alternative technique is also provided such that the communication interruption is checked for all source apparatuses which should have been connected to the GW-ECU 20 via the communication line 60, regardless of whether or not information showing the connection history is stored. This also means that the checking step at step S22 precedes that at steps S21.

Figure 6:
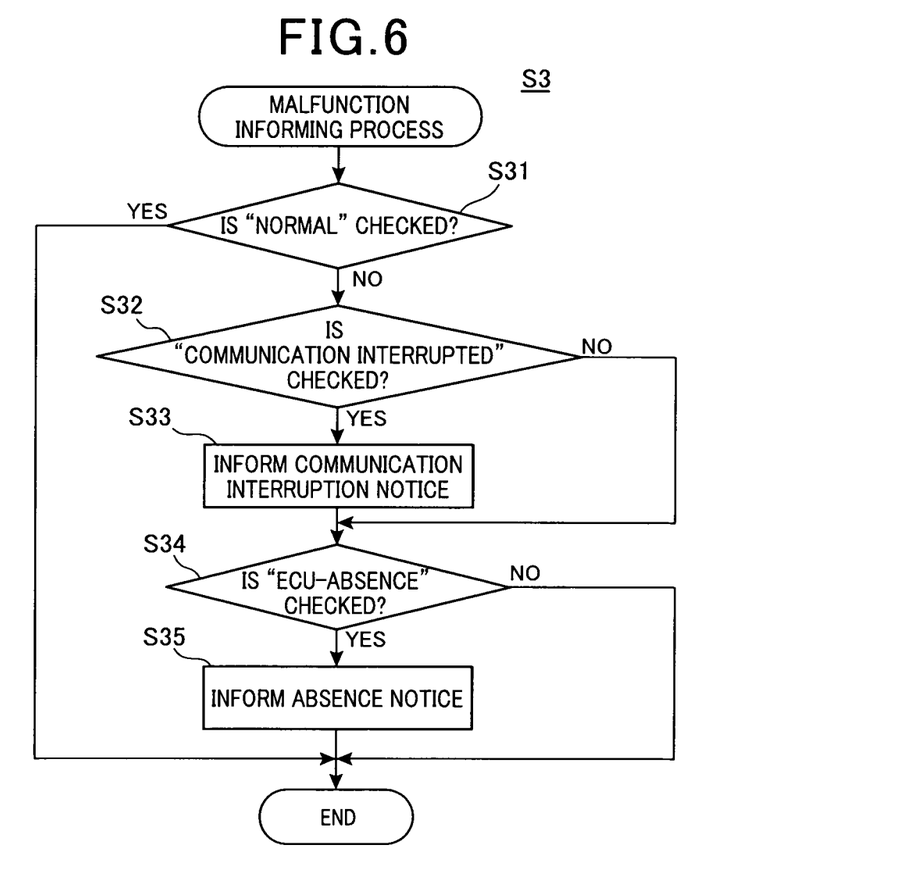
FIG. 6 is a flowchart exemplifying a malfunction informing process executed by the malfunction informing apparatus.

The malfunction informing section 24 is configured to execute a malfunction informing process S3 at intervals, which is shown in FIG. 6. Practically, when this informing process S3 is activated, the processing at step S31 is first executed, where it is checked whether or not the communication with the monitoring ECU 11 has been checked as being "normal" by the communication interruption checking section 23.

If this checked result at step S31 is YES, that is, being checked as normal, the malfunction informing section 24 does not provide any message to the meter ECU 31. If the checked result at step S31 is NO, that is, being not checked as normal (i.e., malfunctioning in the communication between the GW-ECU 20 and the monitoring ECU 11), the malfunction informing section 24 proceeds to checking step S32.

At step S32, the malfunction informing section 24 checks whether or not the communication with the monitoring ECU 11 has been checked as being "communication interruption" by the section 23. If this checked result at step S32 is YES which shows "communication interruption," the malfunction informing section 24 executes step S33 to inform, through the communication line 70, the meter ECU 31 of the fact that the communication between the GW-ECU 20 and the monitoring ECU 11 is now interrupted. This information is a communication interruption message. In contrast, if the checked result is NO at step S32, that is, there is no communication interruption, the section 24 goes to checking step S34.

At step S34, the malfunction informing section 24 checks whether or not the communication interruption checking section 23 has checked that the monitoring ECU 11 is absent. If this checked result is YES at step S34, which means that there is no monitoring ECU connected to the GW-ECU 20, the informing section 24 proceeds to step S35, where this section 24 informs, via the communication line 70, the meter EU 31 of the absence of the monitoring ECU connected to the GW-ECU 20. This information is sent as an absence message. If the checking process at step S34 shows NO, that is, there is no absence of the monitoring ECU, the malfunction informing section 24 should terminate the malfunction informing process S3.

Figure 7:
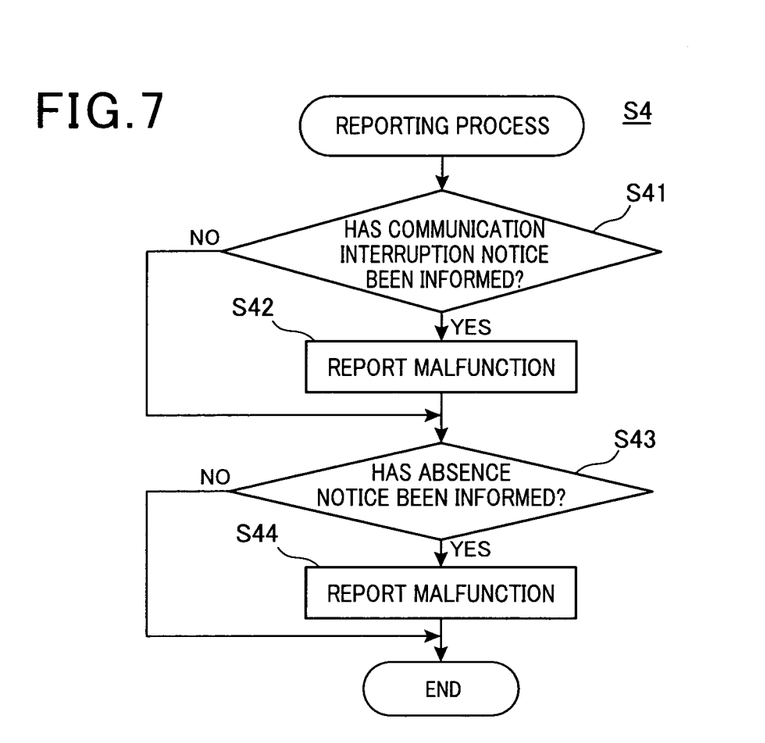
FIG. 7 is a flowchart exemplifying a reporting process executed by a reporting apparatus included in the malfunction reporting system.

The meter apparatus 30 is provided with the meter ECU 31 which executes, at intervals, a reporting process S4 shown in FIG. 7.

Practically the meter ECU 31 activates the reporting process S4, and first executes a checking step S41, where it is checked whether or not the "communication interruption message" has been informed from the GW-ECU 20.

If the checking at step S41 shows YES, that is, the "communication interruption message" has been informed, the meter ECU 31 proceeds to step S42 to make the display unit 50 operate to display a message thereon. Practically, by this screen display, there is provided a message that a malfunction is occurring in the connection between the GW-ECU 20 and the monitoring ECU 11, more precisely, at least one of the monitoring ECU 11 and the communication line 60 is malfunctioning. If it is checked NO at step S41, that is, there is no "communication interruption message" from the GW-ECU 20, the meter ECU 31 proceeds to the next checking step S43.

At step S43, the meter ECU 31 checks whether or not the absence message has been sent from the GW-ECU 20. If YES at step S43 comes out, i.e., the absence message has been informed, the meter ECU 31 drives the display unit 50 so as to provide a screen display. This screen display informs that the connection with the monitoring ECU 11 is malfunctioning, more practically, the monitoring ECU connected to the GW-ECU 20 is absent. In contrast, the checking at step S43 is NO, that is, there is no absence message from the GW-ECU 20, the meter ECU 31 will terminate this reporting process S4.

The malfunction informing apparatus and malfunction reporting system according to the present embodiment can provide the following various advantages.

In the present embodiment, information showing that the monitoring ECU 11 is due to be connected to the GW-ECU 20 via the communication line 60 is stored in the meter ECU 31. Hence, even when the meter ECU 31 has no information showing history of connection with the monitoring ECU 11, the meter ECU 31 is able to inform, via the communication line 70, that there occurs a malfunction in the connection with the monitoring ECU 11.

In cases where a monitoring ECU is absent in the system, there is no communication between the GW-ECU 20 and the monitoring ECU, as is obvious. In this case, the connection-history write section 22 does not write, in the memory section 21, information showing history of connection with the monitoring ECU. Even in this case, since the information showing that the monitoring ECU is due to be connected with the GW-ECU 20 through the communication line 60 is already stored in the embedded memory 31A of the meter ECU 31, the GW-ECU 20 informs a malfunction in the connection with the monitoring ECU (that is, information showing the absence of the monitoring ECU), through steps S25 and S35.

Further, if the monitoring ECU 11 and/or the communication line 60 is already out of order when being connected with the GW-ECU 20, the GW-ECU cannot communicate with the monitoring ECU 11 through the communication line 60. As a result, the connection-history write section 22 does not writhe connection history about the monitoring ECU 11 into the memory section 21. Even in this case, in the same way as above, since the information showing the monitoring ECU is due to be connected with the GW ECU 20 through the communication line 60 is stored in the embedded memory 31A of the meter ECU 31, the GW-ECU 20 informs a malfunction in the connection with the monitoring ECU 11, through steps S25 and S35.

In addition to the above informing functions, when the connection history information about the monitoring ECU 11 is stored in the memory section 21, the GW-ECU 20 is able to inform the meter ECU 31 of a malfunction in the connection, through steps S24 and S33.

Accordingly, it is possible to avoid or reduce a state where a malfunction in the connection cannot be informed although the connection is actually out of order.

That is, independently of whether or not information showing the connection history of the monitoring ECU 11 is stored in the memory section 21, it is possible to reliably inform that there is occurring a malfunction in the connection with the monitoring ECU 11.

Since connection malfunctions can be informed as above independently of the connection history in the memory section 21, it is not necessary to precisely manage information about the history of connections in the memory section 21 of the GW-ECU 20. This means that, when exchanging GW-ECUs, it is not always necessary to read information about connection history stored in the memory section 21 of the old GW-ECU 20 and then write the read information into the memory section 21 of the new GW-ECU 20. A writing task of writing the connection history between the old and new GW-ECUs can be skipped, thus eliminating the possibility of erroneously writing or forgetting the connection history information and reducing a time necessary for repair work. In addition, it is not necessary to prepare supplies (GW-ECUs) which are subjected to writing work in advance.

In the present embodiment, the malfunction informing section 24 informs the meter ECU 31 of an interruption of communication with the monitoring ECU 11, when the communication interruption checking section 23 checks the interruption (steps S24 and S33). On the other hand, when connection history information about the monitoring ECU 11 is not stored in the memory section 21, the malfunction informing section 24 informs, to the meter ECU 31, a state where the monitoring ECU 11 is not connected to the communication line 60 (steps S25 and S35), with the embedded memory 31A of the meter ECU 31 keeping therein information showing that the monitoring ECU 11 is due to be connected to the GW-ECU 20 via the communication line 60. This makes it possible to distinguish two types of malfunctions from each other and inform such malfunctions in different ways, where one type of malfunction shows that the monitoring ECU 11 is not connected to the communication line, i.e., the GW-ECU 20 is absent from the system, and the other shows an interruption of the communication with the GW-ECU 20, i.e., the GW-ECU 20 is present in the system, but is malfunctioning it its communication.

The present embodiment is applied to the system having the monitoring ECU 11 for monitoring the air pressure and temperature of the tires of a vehicle and the GW-ECU 20 communicably connected to the monitoring ECU 11 via the communication line 60. Hence, vehicles provided with the system according to the present embodiment can be useful, especially when the vehicles are commercially sold in districts or countries in which installation of the tire pressure monitoring system is regulated by law. In conventional malfunction informing apparatuses, communication interruptions are checked only when information showing "connection history" is written in a nonvolatile memory. This conventional checking technique is thus insufficient in informing that the tire pressure monitoring apparatus is not connected to the communication line; that is, not mounted in the vehicle. In contrast, the system according to the present embodiment can eliminate various difficulties resulting from the foregoing unconnected (and non-mounted) conditions in the conventional system. The reason is that un-connection of the tire pressure monitoring apparatus to the communication line 60, that is, non-mounting the tire pressure monitoring apparatus in a vehicle, is always informed or reported, whenever a vehicle is shipped from a manufacture's factory or a repair factory after repair.

(Modifications)

The malfunction informing apparatus and malfunction reporting system described above can modified in different manners, which are described below.

In the foregoing embodiment, the information indicating that a "monitoring ECU is due to be connected" (i.e. information showing presence or absence of a source apparatus in the system) is previously written in the embedded memory 31A of the meter ECU 31. However, this is just an example and not limited to such a way of storing the data. Such information may be stored in the memory section 21 of the GW-ECU 20. In other words, the memory section 31A may be removed from the reporting apparatus 30 (meter ECU 31) to the malfunction informing apparatus (GW-ECU 20).

Figure 8:
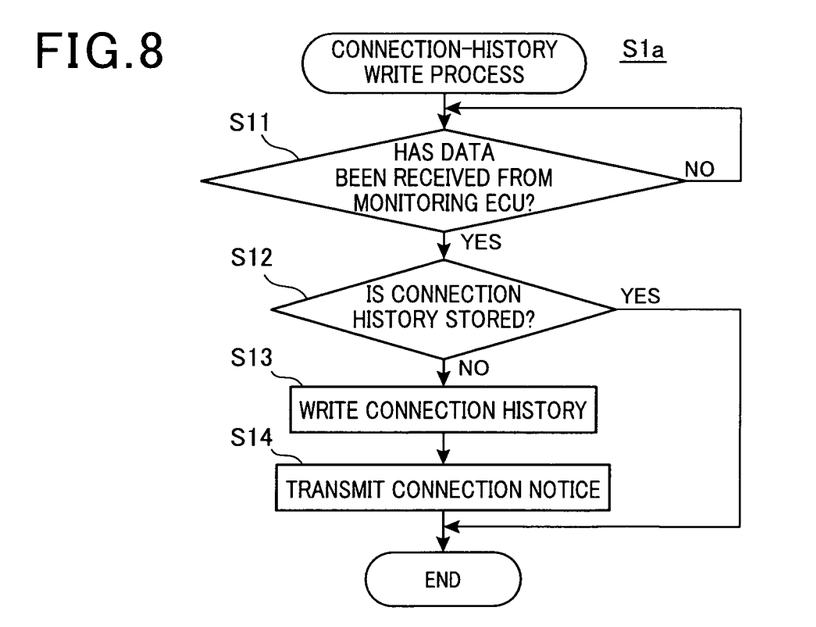
FIG. 8 is a flowchart exemplifying a connection-history write process executed by a malfunction informing apparatus according to another embodiment of the present invention.
Figure 9:
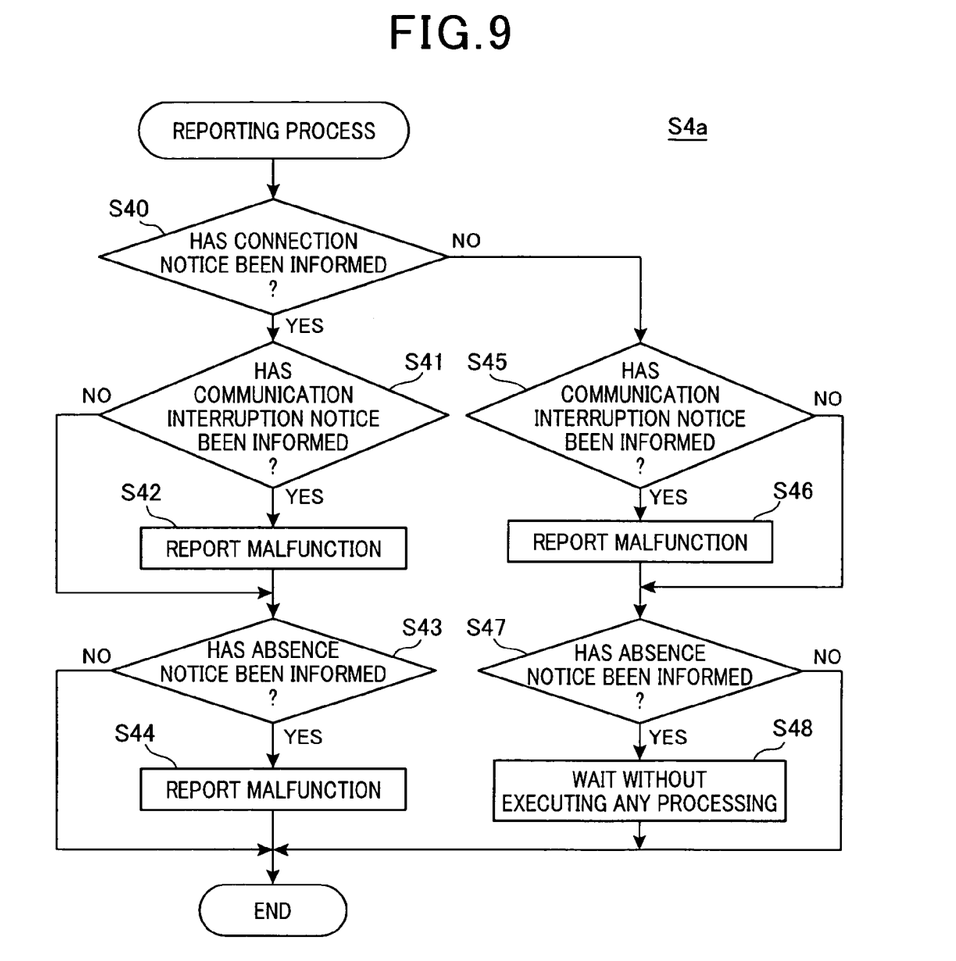
FIG. 9 is a flowchart exemplifying a reporting process executed by a malfunction reporting system according to another embodiment of the present invention.

Another modification can by shown in FIGS. 8 and 9, in which a connection informing section is provided instead of using the memory section 21. The GW-ECU 20 performs a connection-history write process S1a shown by FIG. 8, in which steps S11-S13 correspond to those shown in FIG. 4. Meanwhile, the meter ECU 31 performs an informing process S4a shown by FIG. 9, in which steps S41-S44 corresponds to those shown in FIG. 7. This modification can provide the similar advantages to those provided by the foregoing embodiment.

Practically, in the processing of FIG. 8, the GW-ECU 20 (in detail, the connection-history write section 22) executes step S14 which follows step S13. At step S14, the GW-ECU 20 informs, via the communication line 70, the meter ECU 31 of a connection message indicating that information showing the history of connection with the monitoring ECU 11 has been written in the memory section 21. The connection-history write section 22 functions as a connection message section in this modification.

As shown in FIG. 9, the meter ECU 31 first executes a checking step S40 in the informing process S4a. Concretely, at step S40, the meter ECU 31 checks whether or not the "connection message" has been informed from the GW-ECU 20.

If the checking at step S40 shows YES, that is, the connection message has been informed from the GW-ECU 20, the meter ECU 31 executes in turn the foregoing steps S41-S44. Meanwhile, NO is checked at step S40, i.e., the connection message has not been informed, the meter ECU 31 sequentially executes steps S45-S48.

The step S45 is followed when it is checked that the connection message has not been informed at step S40. At step S45, it is checked whether or not a "communication interruption message" is informed from the GW-ECU 20.

If the checked result at step is YES, i.e., the communication interruption notice is informed from the GW-ECU 20, the meter ECU 31 proceeds to step S46 where the meter ECU 31 instructs the display unit 50 to perform its screen display to report a malfunction of the GW-ECU 20 thereon. This malfunction of the GW-ECU 20 can be reported, because the monitoring ECU 60 is connected to the GW-ECU 20 via the communication line 60 and the GW-ECU 20 issues the communication interruption notice. Originally a connection of the monitoring ECU 11 with the GW-ECU 20 via the communication line 60 should the GW-ECU 20 to inform the meter ECU 31 of a connection notice. However, in the present modification, the communication interruption notice itself is informed in a state where the connection notice is not informed, which shows that the GW-ECU 20 itself is out of order.

If the rechecked result at step S45 is NO, that is, the communication interruption notice is not informed from GW-ECU 20, the meter ECU 31 proceeds to step S47 for checking whether or not an ECU-absence notice has been informed from the GW-ECU 20.

If the checked result shows YES at step S47, i.e., the ECU-absence notice is informed, the meter ECU 31 moves to step S48 to just wait for the next timing for a predetermined period of time without executing any processing toward a monitoring ECU. This is because any monitoring ECU is not connected to the communication line 60.

In contrast, the checked result at step S47 is NO, i.e., no ECU-absence notice has not been informed from the GW-ECU 20, the meter ECU 31 ends the informing process S4a immediately.

What is claimed is:

1. A malfunction informing system comprising:
   a malfunction informing apparatus that includes:
     a connection history write section that writes connection history into a history memory section on the basis of reception of data from a source transmission apparatus via a communication line, the connection history showing that the source transmission apparatus has been connected to the communication line;
     a communication interruption determining section that determines whether or not communication is interrupted, on the basis of conditions of data reception via the communication line, for the source transmission apparatus of which at least the connection history is stored in the history memory section; and
     a malfunction informing section that informs of abnormality in conditions of connection with the source transmission apparatus via the communication line, when the communication interruption determining section determines that communication is interrupted, and
   a reporting apparatus that reports a malfunction on the basis of information given by the malfunction informing apparatus; wherein
   the system further comprises a source transmission memory section that stores in advance source transmission apparatus information; and
   the malfunction informing section of the malfunction informing apparatus informs the reporting apparatus of abnormality in conditions of connection with the source transmission apparatus via the communication line, when source transmission apparatus information is stored in the source transmission memory section but connection history of the source transmission apparatus is not stored in the history memory section.

2. The malfunction informing system according to claim 1, wherein:
   the malfunction informing section of the malfunction informing apparatus informs the reporting apparatus that communication with the source transmission apparatus is interrupted, when the communication interruption determining section determines that communication is interrupted; and
   the malfunction informing section of the malfunction informing apparatus informs the reporting apparatus that the source transmission apparatus is not connected to the communication line, when the source transmission apparatus information is stored in the source transmission memory section but the connection history is not stored in the history memory section.

3. The malfunction informing system according to claim 2, wherein the malfunction informing system is connected to a tire pressure monitoring apparatus, as the source transmission apparatus, via the communication line, the tire pressure monitoring apparatus monitoring tire pressure using radio communication with pressure sensors provided at respective tires of the vehicle.

4. The malfunction informing system according to claim 1, wherein the malfunction informing system is connected to a tire pressure monitoring apparatus, as the source transmission apparatus, via the communication line, the tire pressure monitoring apparatus monitoring tire pressure using radio communication with pressure sensors provided at respective tires of the vehicle.

5. A malfunction informing system comprising:
   a malfunction informing apparatus that includes:
     a connection history write section that writes connection history into a history memory section on the basis of reception of data from a source transmission apparatus via a communication line, the connection history showing that the source transmission apparatus has been connected to the communication line;

a communication interruption determining section that determines whether or not communication is interrupted, on the basis of conditions of data reception via the communication line, for the source transmission apparatus of which the connection history is stored in the history memory section; and a malfunction informing section that informs of abnormality in conditions of connection with the source transmission apparatus via the communication line, when the communication interruption determining section determines that communication is interrupted, and a reporting apparatus that reports a malfunction on the basis of information given by the malfunction informing apparatus; wherein the malfunction informing section of the malfunction informing apparatus informs the reporting apparatus that communication with the source transmission apparatus is interrupted, when the communication interruption determining section determines that communication is interrupted;

the malfunction informing section of the malfunction informing apparatus informs the reporting apparatus that the source transmission apparatus is not connected to the communication line, when the connection history is not stored in the history memory section;

the malfunction informing apparatus further includes a connection notification section that, when connection history of the source transmission apparatus has been written into the history memory section, gives a connection notification indicating accordingly to the reporting apparatus;

the reporting apparatus reports that a failure has occurred at least in either one of a part of the communication line, the part connecting between the source transmission apparatus and the malfunction informing apparatus, and the source transmission apparatus, when being informed by the malfunction informing apparatus that communication with the source transmission apparatus is interrupted, after being given a connection notification of the source transmission apparatus; and the reporting apparatus reports that the source transmission apparatus is not connected to the communication line, when being informed by the malfunction informing apparatus that the source transmission apparatus is not connected to the communication line, after being given a connection notification of the source transmission apparatus.

6. The malfunction informing system according to claim 5, wherein the reporting apparatus reports that the malfunction informing apparatus has a failure, when being informed by the malfunction informing apparatus that communication with the source transmission apparatus is interrupted while being given no connection notification of the source transmission apparatus.

7. The malfunction informing system according to claim 6, wherein the malfunction informing system is connected to a tire pressure monitoring apparatus, as the source transmission apparatus, via the communication line, the tire pressure monitoring apparatus monitoring tire pressure using radio communication with pressure sensors provided at respective tires of the vehicle.

8. The malfunction informing system according to claim 5, wherein the malfunction informing system is connected to a tire pressure monitoring apparatus, as the source transmission apparatus, via the communication line, the tire pressure monitoring apparatus monitoring tire pressure using radio communication with pressure sensors provided at respective tires of the vehicle.

9. A malfunction informing apparatus comprising:

a connection history write section that writes connection history into a history memory section on the basis of reception of data from a source transmission apparatus via a communication line, the connection history showing that the source transmission apparatus has been connected to the communication line;

a communication interruption determining section that determines whether or not communication is interrupted, on the basis of conditions of data reception via the communication line, for the source transmission apparatus of which at least the connection history is stored in the history memory section; and a malfunction informing section that informs of abnormality in conditions of connection with the source transmission apparatus via the communication line, when the communication interruption determining section determines that communication is interrupted, wherein the malfunction informing section of the malfunction informing apparatus informs the reporting apparatus of abnormality in conditions of connection with the source transmission apparatus via the communication line, when source transmission apparatus information is stored in a source transmission memory section but connection history of the source transmission apparatus is not stored in the history memory section.

10. A malfunction informing apparatus comprising:

a connection history write section that writes connection history into a history memory section on the basis of reception of data from a source transmission apparatus via a communication line, the connection history showing that the source transmission apparatus has been connected to the communication line;

a communication interruption determining section that determines whether or not communication is interrupted, on the basis of conditions of data reception via the communication line, for the source transmission apparatus of which the connection history is stored in the history memory section; and a malfunction informing section that informs of abnormality in conditions of connection with the source transmission apparatus via the communication line, when the communication interruption determining section determines that communication is interrupted, wherein the malfunction informing section of the malfunction informing apparatus informs a reporting apparatus that communication with the source transmission apparatus is interrupted, when the communication interruption determining section determines that communication is interrupted;

the malfunction informing section of the malfunction informing apparatus informs the reporting apparatus that the source transmission apparatus is not connected to the communication line, when the connection history is not stored in the history memory section;

the malfunction informing apparatus further includes a connection notification section that, when connection history of the source transmission apparatus has been written into the history memory section, gives a connection notification indicating accordingly to the reporting apparatus.

* * * * *